United States Patent [19]
Lush et al.

[11] Patent Number: 5,855,943
[45] Date of Patent: Jan. 5, 1999

[54] METHOD OF FORMING WEATHER RESISTANT SWEET CORN BASED ANIMAL FEED PRODUCTS

[75] Inventors: Raymon W. Lush, Bloomfield, Nebr.; Lee D. Schwalenberg, Waterloo, Wis.

[73] Assignees: Haaco, Inc., Randolph, Wis.; Sweet Corn Products, Co., Bloomfield, Nebr.

[21] Appl. No.: 908,400

[22] Filed: Aug. 7, 1997

[51] Int. Cl.⁶ ....................................................... A23K 1/00
[52] U.S. Cl. ........................... 426/516; 426/448; 426/623
[58] Field of Search ..................................... 426/516, 447, 426/448, 623, 805; 425/131.1, 311

[56] References Cited

U.S. PATENT DOCUMENTS

| | | | |
|---|---|---|---|
| 4,748,037 | 5/1988 | Matsumoto et al. | 426/448 |
| 5,120,565 | 6/1992 | Lanter et al. | 426/448 |

*Primary Examiner*—George Yeung
*Attorney, Agent, or Firm*—Zarley, McKee, Thomte, Voorhees & Sease

[57] ABSTRACT

A method of forming a weather resistant sweet corn based animal feed product includes mixing sweet corn and water to form a sticky mixture which is then extruded through an open tapering die where the mixture is greatly pressurized and ejected as a continuous log of a size and shape dictated by the die. The log is then cut to length to produce weather resistant sweet corn based animal feed products.

10 Claims, 2 Drawing Sheets

METHOD OF FORMING WEATHER RESISTANT SWEET CORN BASED ANIMAL FEED PRODUCTS

BACKGROUND OF THE INVENTION

1. Technical Field

This invention is directed generally to a method of forming weather resistant sweet corn based animal feed products and, more particularly, to an extrusion process which establishes the size, shape and weather resistance of the animal feed products with as little heat as possible because too much heat can alter the taste of the products.

2. Description of the Prior Art

There are various known methods for forming grain based animal feed products but all of these have certain shortcomings. In a pellet mill, for example, heat generated during the pelleting operation can have an effect on the taste of the resulting pellets. Furthermore, it is very difficult to form pellets of uniform size, shape and weight with the use of conventional pelleting machines.

In the past, a wax material was included in the pellet formula to make grain based animal feed products weather resistant. Since most waxes are petroleum derivatives, that likewise had a negative impact on the taste of the weather resistant feed. Furthermore, the wax is expensive and requires further handling of the feed products that include wax in the formulas. Without such an ingredient, known grain based animal feed products tend to spoil, get soft and fall apart over time.

Another drawback of known pelleting machines is the difficulty of controlling the hardness of the end product.

Still other grain based animal feed products are mixed with suet, an unrendered animal fat, or lard with the grain ingredients to hold the grain together into a block. The suet or lard runs when it becomes hot, however, thereby weakening or destroying the shape of the product. Other squirrel blocks and bird blocks may be formed by having cracked grain stuck together with gelatin. Gelatin can likewise liquefy in high moisture conditions, causing the product to fall apart.

Accordingly, a primary object of the invention is to provide an improved method of forming a weather resistant sweet corn based animal feed product.

Another object is to provide such a method which does not require the application of heat during the product forming process.

Another object is to provide such a method wherein the grain of the product is substantially sweet corn, thereby eliminating the need for additives for bonding the product together.

Another object is to provide such a method operative for producing animal feed products of generally uniform shape, size and weight.

Another object is to provide such a method wherein sweet corn and water may be the only ingredients, if desired.

Another object is to provide such a method which eliminates the need for additives and binders for holding the individual pellets or products together.

Another object is to provide such a method which utilizes an extruder that generates as little heat as possible in the forming process.

Another object is to provide such a method which is performed on simple rugged equipment, which is economical and which is efficient in operation.

SUMMARY OF THE INVENTION

The method of the present invention for forming weather resistant sweet corn based animal feed products includes the steps of providing ground sweet corn and water, mixing the sweet corn and water, thereby providing a sticky mixture, providing an extruder including an auger chamber having at least one auger and an open tapering die in communication with the auger chamber for receiving material from it. Further steps include introducing the sticky mixture into said auger chamber of the extruder, operating the auger to force the sticky mixture from said auger chamber and into the open tapering die, pressurizing said sticky mixture in said open tapering die and ejecting a continuous log of pressurized sweet corn based material. The log is cut to length to produce weather resistant sweet corn based animal feed products.

Other grains may be added to the mixture for taste but sweet corn must comprise the majority of the mixture to achieve the natural weather resistant characteristics, cohesiveness and animal acceptance. Water is preferably added to the mixture in a quantity sufficient to achieve a moisture content of between about 5 and 20 percent and preferably about 10 percent. The extrusion process is particularly advantageous in that heat does not have to be applied which can affect the taste of the resultant product. The extrusion process affords wide variability of both the shape and size of the end products. These could range from small pellets for gerbils to large blocks for deer and the like.

It is generally advantageous to provide an axial bore through the animal feed product to facilitate supporting it in use. This bore can be formed in the extruder by a rod extending axially from the auger shaft into and through the open tapering die.

DESCRIPTION OF THE PREFERRED EMBODIMENT

Figure 1:
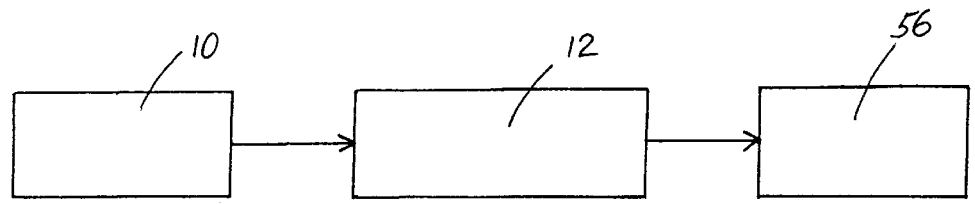
FIG. 1 is a block diagram illustrating the equipment used in the practice of the invention.
Figure 2:
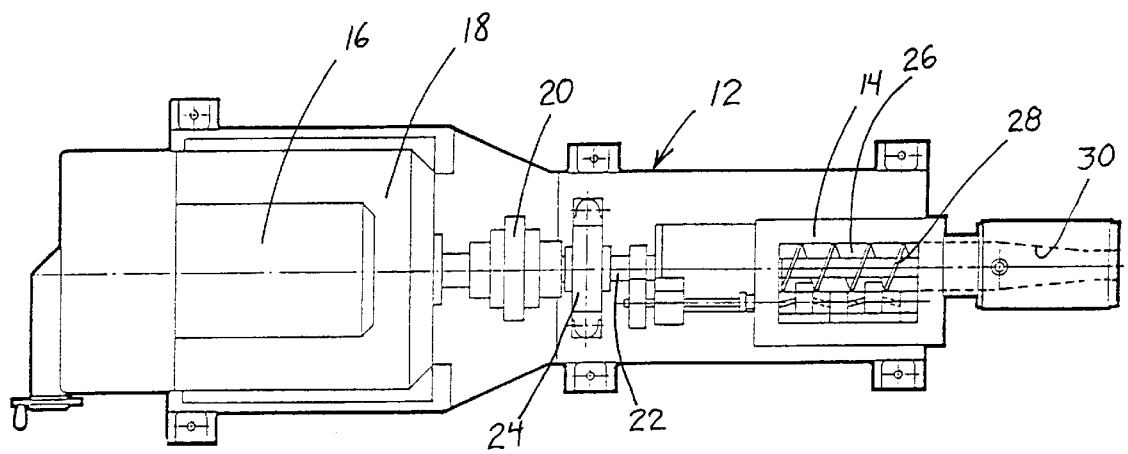
FIG. 2 is a top plan view of the extruder machine for use in practicing the invention.

The process of the present invention is effective for producing a dense natural weather resistant sweet corn based animal feed with as little heat as possible so as not to affect the taste of the product.

The simplest form of the invention is a simple combination of sweet corn and water. The grind of the sweet corn may literally range from the powder form of sweet corn flour to whole grains since some grinding of the sweet corn will occur in the extruder used in connection with a preferred embodiment of the invention.

The blending of ingredients may be accomplished in a double arm blender, a ribbon blender or any other known mixing or blending apparatus. The proportion of water to use is largely a matter of preference. Within normal ranges, increasing the proportion of water increases the hardness of the resulting product as well as its density. Because drying is very expensive, it is generally preferable to use the minimum proportion of water which enables the mixture to flow through the extruder. The preferred proportion of water in the range of 5 to 20 percent by weight, preferably 7 to 15 percent by weight and more preferably about 10 percent.

Other ingredients could be added during the mixing step. For example, the water content could be reduced by 2 or 3 per cent. That water could be replaced with corn oil which makes the product dryer and easier to extrude. Likewise, an anti-mold ingredient may be added. Finally, small proportions of other grains could be added for appearance or if the flavor of such other grains is believed to be beneficial for a particular product. Other possible ingredients for specific products include sunflower seeds, millet, peanut bits, and thistle seeds, among others.

Referring to the drawings, the sticky mixture prepared in the blender 10 is conveyed to the extruder 12 for delivery into the inlet hopper 14. The extruder 12 typically includes a motor 16 connected by a gear reducer 18 and coupler 20 to an auger drive shaft 22 rotatably carried in bearing 24. The inlet hopper 14 may feed the mixture to a live bottom bin 26 with one or more augers operating at variable speeds to prevent caking. Auger 28 forces product from the live bottom bin into and through an open tapering die 30 where the product is subjected to extreme pressure and discharged in a compact solid log of the desired size and shape. Because of the tremendous increase in pressure as the mixture is forced through the open tapering die 30, the resulting product has a higher density than would be achieved with a press exerting the same pressure, for example. The log does expand slightly as it exits the die but the exit opening of the die is typically slightly undersized to produce a product of a desired size and shape.

Figure 3:
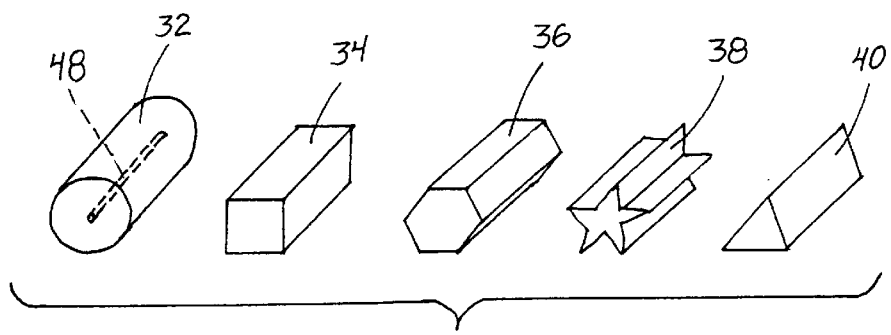
FIG. 3 is a perspective view of animal feed products of various shapes according to the invention.

The open tapering die 30 may be designed to produce a log of various desired cross-sectional shapes and sizes within the capacity limits of the particular extruding machine. FIG. 3, for example, illustrates a bar-shaped product 32, a square section product 34, a hexagonal product 36, a star-section product 38 and a triangular product 40.

The size and shape of the particular animal feed product are somewhat dictated by the intended use. For example, the squirrel feeder log 42 shown in FIG. 4 may be a round rod-shaped log having a diameter of 2¼" and a length between 8 and 12 inches. The bird feeder log of FIG. 5 may have a similar diameter but a shorter length and may include ingredients particularly attractive to birds or a particular variety of birds. On the other hand, the gerbil or hamster feed pellets 46 shown in FIG. 6 may be 1" in diameter and approximately 1" long Other possible uses for the animal feed products of the invention are horse treats, dog bones, and blocks for attracting squirrel, bears, deer or other wildlife.

Figure 4:
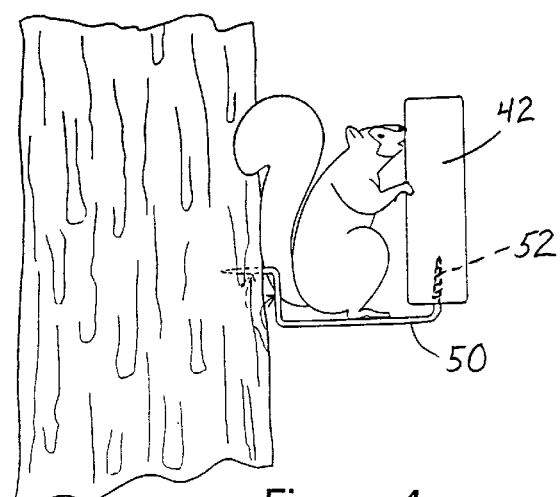
FIG. 4 is a side elevational view of a squirrel block, in use.
Figure 5:
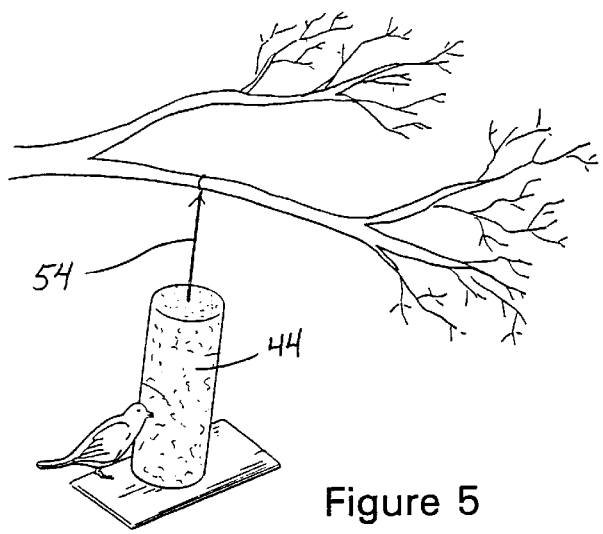
FIG. 5 is a perspective view of a bird block, in use.
Figure 6:
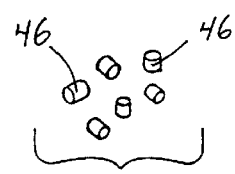
FIG. 6 is a perspective view of small feed chunks formed by the process of the invention.

For many of these application such as the squirrel block 42 in FIG. 4 and the bird block 44 shown in FIG. 5, it is desirable to provide an axial bore 48 through the block as illustrated in the round log of FIG. 3. This bore can be formed in the extruder by providing a bolt extending from the end of auger 28 through the open tapering die 30. The bolt would typically be oversized compared to the desired bore diameter to accommodate partial collapsing of the bore as the product exits the open tapering die 30. That bore can facilitate mounting the animal feed product on a screw, wire, nail or other hanger. For larger products such as the squirrel block of FIG. 4, the feeder bracket 50 may have an upright free end 52 which is threaded for securely receiving the log 42 thereon as the threads are received into bore 48. The bore through the bird block 44 accommodates passage of the string 54 or another tension member for hanging the block from a tree or other support member.

The final step in forming the sweet corn based animal feed product is to cut the log to length. Typically, the log extruded from the open tapering die 30 would be directed through open air for a limited distance where it would be engaged by a cutter 56. The cutter may have a wheel thereon which measures the distance of the log as it is advanced past the cutter and a sensor for activating a knife which is directed through the product at the desired length. The wheel would be calibrated to product products of a given weight. Cutters 56 of various designs are commercially available.

Whereas the invention has been shown and described in connection with particular embodiments thereof, it is understood that many additions, modifications and substitutions may be made which are within the intended broad scope of the appended claims.

We claim:

1. A method of forming weather resistant sweet corn based animal feed products, comprising providing ground sweet corn and water, mixing the sweet corn and water, thereby producing a sticky mixture, providing an extruder including an auger chamber having at least one auger and an open tapering die in communication with said auger chamber for receiving material therefrom, introducing said sticky mixture into said auger chamber of the extruder, operating said auger to force said sticky mixture from said auger chamber and into said open tapering die, pressurizing said sticky mixture in said open tapering die and ejecting a solid continuous log of pressurized sweet corn based material, and cutting said log to length, thereby producing weather resistant sweet corn based animal feed products.

2. The method of claim 1 wherein said mixing step comprises mixing in sufficient water for said sticky mixture to have a moisture content of approximately 10 per cent.

3. The method of claim 1 wherein said mixing step comprises mixing in sufficient water for said sticky mixture to have a moisture content of between 5 and 20 per cent by weight.

4. The method of claim 1 further comprising selecting a cross-sectional shape for said log of pressurized sweet corn based material, said step of providing an extruder comprising providing an open tapering die having a discharge opening of the cross-sectional shape selected.

5. The method of claim 4 further comprising selecting a diameter for said log of pressurized sweet corn based material, said step of providing an extruder comprising providing an open tapering die having a discharge opening of a size to produce products of the diameter selected.

6. The method of claim 5 further comprising forming an axial bore through said sweet corn based animal feed products.

7. The method of claim 6 wherein the step of forming an axial bore through said sweet corn based animal feed products comprises mounting a rod on said auger at a position axially aligned with a central axis of said open tapering die.

8. The method of claim 7 wherein the step of cutting said log to length comprises cutting said log into animal feed products of generally uniform size, shape and weight.

9. The method of claim 8 wherein said animal feed product is a squirrel feeder log having a diameter of approximately 2¼".

10. The method of claim 1 wherein the step of providing an extruder comprises providing a cold extrusion machine.

* * * * *